(12) United States Patent
Shi

(10) Patent No.: US 11,808,438 B1
(45) Date of Patent: Nov. 7, 2023

(54) FILL LIGHT

(71) Applicant: Emart International, Inc., Rowland Heights, CA (US)

(72) Inventor: Tinglei Shi, City of Industry, CA (US)

( * ) Notice: Subject to any disclaimer, the term of this patent is extended or adjusted under 35 U.S.C. 154(b) by 0 days.

(21) Appl. No.: 17/810,643

(22) Filed: Jul. 5, 2022

(51) Int. Cl.
*F21V 21/22* (2006.01)
*F21V 21/30* (2006.01)

(52) U.S. Cl.
CPC .............. *F21V 21/22* (2013.01); *F21V 21/30* (2013.01)

(58) Field of Classification Search
CPC ............................... G02B 15/03; G02B 15/02; G02B 2215/0575; F21V 21/30; F21V 21/22
See application file for complete search history.

(56) References Cited

FOREIGN PATENT DOCUMENTS

| CN | 112503455 A | * | 3/2021 |
| CN | 114440200 A | * | 5/2022 |

* cited by examiner

*Primary Examiner* — Anabel Ton
(74) *Attorney, Agent, or Firm* — Tsz Lung Yeung

(57) ABSTRACT

A fill light includes a lighting assembly, a supporting assembly and a device holder that is capable of being supported by the supporting assembly, wherein the lighting assembly includes a lighting body, a retainer and a base, wherein the lighting body is pivotally coupled to the retainer, wherein the retainer is adjustably arranged on the base, wherein the base retains and supports the retainer on the supporting assembly, wherein the retainer supports the lighting body, so as to allow the lighting body to form a fill lighting area by illumination of the lighting body, wherein when a photographing device is held by the device holder, the lighting body provides fill lighting for the photographing device.

15 Claims, 14 Drawing Sheets

FILL LIGHT

BACKGROUND OF THE PRESENT INVENTION

Field of Invention

The present invention relates to a lighting device, and more particularly to a fill light.

Description of Related Arts

During photographing and video shooting, the shooting effect is often not good due to insufficient lighting. In order to improve the shooting performance and quality, it is usually necessary to employ a professional lighting equipment to solve the problem of insufficient light. A built-in flashing light device of a shooting device such as a mobile phone and a camera no longer meet the requirements in current occasions for taking pictures and shooting videos.

With the development of the live broadcasting industry, people pay more and more attention to the quality of video shooting, a fill lighting kit which also can function as a mobile phone bracket is becoming more and more popular. The mobile phone can be attached to the fill lighting kit which can provide supplemental lighting for the mobile phone used for taking pictures and shooting videos, so as to meet the user's demand for shooting quality.

A conventional fill lighting kit has at least one of the following defects. Firstly, the conventional fill lighting kit is fixedly installed with the mobile phone in such a manner that a light emitting surface of the fill lighting kit and a camera of the mobile phone are arranged at the same side, so the shooting direction of the camera of the mobile phone is also the light emitting direction of the conventional fill lighting kit. However, this configuration of the conventional fill lighting kit will adversely affect the adjustment of the shooting direction of the camera of the mobile phone by the user because the camera of the mobile phone can only shoot in the fixed direction which is the same direction of the light irradiation direction of the conventional fill lighting kit. Secondly, the conventional fill lighting kit supports the mobile phone at a middle position thereof that the weight of the conventional fill lighting kit with the mobile phone is relatively large during use, and it will make the center of gravity be unstable, so that the conventional fill lighting kit is difficult to adapt to different occasions. Thirdly, with the light compensation easy to be too much by the conventional fill lighting kit that is coupled to the shooting device, during the live broadcasting or video shooting process, the conventional fill lighting kit will easily affect the eyes of a person to be photographed, because his or her eyes have to face directly to the fill lighting kit, and even his or her eyes may get burned in severe cases.

In addition, it is difficult for the conventional fill lighting kit to adapt to the varied shooting distances and the varied light intensities. When the user uses it at a close distance, such as when taking a selfie or a live broadcast, the light from the fill lighting kit is too strong that it may result distortion of an image or a video captured by the shooting device because the image or the video is too bright. When using it at a relatively long distance for shooting a long shot, the light of the conventional fill lighting kit may be insufficient for the relatively long distance, which will cause the captured image or video to be too dark and cannot achieve a good shooting effect. The current design of the conventional fill lighting kit usually fixes the mobile phone on a lamp head, so that the mobile phone or other shooting device rotate with the rotation of the lamp head, so that the adjustable angle is relatively small, and thus is difficult to meet the needs of users for different light intensities and different shooting scenes. The conventional fill lighting kit can meet the fill light needs of a fixed position in someway. But when used outdoors, it is difficult for the conventional fill lighting kit to meet the needs of mobile fill light, especially when taking selfies or users need to take pictures by themselves, the conventional fill lighting kit is difficult to meet the actual needs of during usage.

The mobile phone as a shooting device needs to cooperate with the fill lighting kit and the cooperation requires various adjustable illumination angles of the fill lighting kit, but the conventional fill lighting kit is difficult to meet the actual use requirements of the shooting angles of the mobile phone.

SUMMARY OF THE PRESENT INVENTION

The invention is advantageous in that it provides a fill light which is adapted for holding a photographing device such a mobile phone and for providing make-up lighting for the photographing device, so as to increase the shooting quality of the image and video captured by the photographing device.

Another advantage of the present invention is to provide a fill light which is able to adjust its illumination angle, so as to meet different illumination requirements of the photographing device, so that it is beneficial to improve the applicability of the fill light.

Another advantage of the present invention is to provide a fill light, wherein the photographing device is adjustably held by the fill light, and when the illumination direction of the fill light is fixed, the user can adjust the photographing device to obtain a suitable shooting angle, so that it is beneficial to improve the shooting quality of the photographing device.

Another advantage of the present invention is to provide a fill light, wherein the fill light comprises a lighting assembly, a supporting assembly and at least one device holder, the lighting assembly is adjustably arranged on the supporting assembly, wherein the device holder is supported by the supporting assembly, and the holding posture can be adjusted based on the supporting assembly, so that it is beneficial to reduce a center of gravity of the fill light and improve the stability of the fill light.

Another advantage of the present invention is to provide a fill light, wherein the lighting assembly and the device holder of the fill light can rotate with respect to each other, and the illumination direction of the lighting assembly can be adjusted to fit the illumination demand of the photographing device, so that it is beneficial for improving applicability of the fill light.

Another advantage of the present invention is to provide a fill light, wherein the supporting assembly of the fill light can be telescopically adjusted, and the height of the lighting assembly of the fill light can be adjusted by the supporting assembly, so that it is beneficial to improve the applicability of the fill light.

Another advantage of the present invention is to provide a fill light, wherein the fill light further comprises a remote control unit, wherein the remote control unit is communicatively connected to the photographing device, and operation of the photographing device is controlled by the remote control unit.

Another advantage of the present invention is to provide a fill light, wherein the lighting assembly of the fill light has two or more lighting modes, such as white light mode, yellow light mode, warm white mode, etc., so that by adjusting the lighting modes of the fill light, the fill light can be adapted to different shooting environments.

Another advantage of the present invention is to provide a fill light, wherein the position and angle of the device holder and/or the position and angle of the lighting assembly can be adjusted by the user according to the shooting distance required, so as to meet the shooting requirements of the photographing device.

Another advantage of the present invention is to provide a fill light, wherein the lighting assembly can be adjusted to have a variety of light intensity working modes, so that the fill light provides a fill lighting area formed by the illumination of the lighting assembly that is suitable for various shooting distances of the photographing device, so that it is beneficial to improve the shooting performance of the photographing device.

Another advantage of the present invention is to provide a fill light, wherein by adjusting the light intensity of the light emitted by the lighting assembly and the illumination angle of the lighting assembly, the make-up fill lighting required by the photographing device is adapt to the photographing distance, so that the shooting performance of the photographing device is enhanced.

Another advantage of the present invention is to provide a fill light, wherein a stand of the fill light and a telescoping rod are detachably connected, and when the stand is removed from the telescoping rod, the fill light can be used as a mobile fill light, wherein when the stand is installed on the telescoping rod, the fill light can be used as a fixed fill light, so that it is beneficial to improve the applicability of the fill light.

Another advantage of the present invention is to provide a fill light, wherein the lighting assembly has a light condensing mode and an astigmatic fill light mode. When the lighting assembly is in the light condensing mode, the light emitted by the lighting assembly is concentrated to be along a central axis of the lighting assembly, so that it is suitable for providing fill lighting at long shooting distance or to a small shooting area. When the lighting assembly is in the astigmatism fill light mode, the light emitted by the lighting assembly is scattered towards the outside of the lighting assembly in a scattering pattern, so that it is suitable for providing fill lighting at a short shooting distance or to a large shooting area.

Additional advantages and features of the invention will become apparent from the description which follows, and may be realized by means of the instrumentalities and combinations particularly pointing out in the appended claims.

According to the present invention, the foregoing and other objects and advantages are attained by a fill light for photographing device, comprising:

a lighting assembly;

a supporting assembly, wherein the lighting assembly is adjustably arranged on the supporting assembly; and a device holder that is capable of being supported by the supporting assembly, wherein the lighting assembly comprises a lighting body, a retainer and a base, wherein the lighting body is pivotally coupled to the retainer, wherein the retainer is adjustably arranged on the base, wherein the base retains and supports the retainer on the supporting assembly, wherein the retainer supports the lighting body, so as to allow the lighting body to form a fill lighting area by illumination of the lighting body, wherein when the photographing device is held by the device holder, the lighting body provide fill lighting for the photographing device.

According to an embodiment of the present invention, the lighting assembly is arranged on a top of the supporting assembly, wherein the device holder is detachably mounted to the supporting assembly at a position below the lighting assembly.

According to an embodiment of the present invention, the retainer is selected from the group consisting of a spherical pan-tilt head, a hemispheric pan-tilt head, and a three-dimensional pan-tilt head holder.

According to an embodiment of the present invention, wherein the lighting body has a circular shape, so as to provide annular illumination towards the fill lighting area.

According to an embodiment of the present invention, the lighting body comprises a housing, a cover and at least one lighting element provided between the housing and the cover, wherein the at least one lighting element is electrically conducted so as to be able to provide the illumination.

According to an embodiment of the present invention, the lighting body further comprises a control unit which is electrically connected to the at least one lighting element, so as to control working modes of the at least one lighting element, wherein by control of the control unit, the at least one lighting element of the lighting body is capable of providing a white light mode, a yellow light mode, and a warm white mode.

According to an embodiment of the present invention, the at least one lighting element of the lighting body has a light condensing mode, a parallel light mode and an astigmatic mode, wherein the at lease one lighting element is switched among the light condensing mode, the parallel light mode and the astigmatic mode, wherein in the light condensing mode, light emitted by the at least one lighting element converges toward a central axis of the lighting body; wherein in the parallel light mode, light emitted by the at least one lighting elements is parallel to the central axis of the lighting body; wherein in the astigmatic mode, light emitted by the at least one lighting element is radiated outward from the light body, so as to increase the fill lighting area formed by illumination of the lighting body.

According to an embodiment of the present invention, in the light condensing mode and the astigmatism mode, an angle $\alpha$ between light emitted by the lighting body and the central axis of the lighting body is in a range of $0°<\alpha<10°$.

According to an embodiment of the present invention, the retainer comprises a retaining connector and a retaining supporter, wherein the lighting body is mounted to the retaining connector of the retainer, wherein the retaining connector is pivotally connected to the retaining supporter, so as to allow pivotal movement of the retaining connector.

According to an embodiment of the present invention, the retaining connector comprises a support rod and a ball body connected to the support rod, wherein the retaining supporter comprises a base body, a base seat at a bottom of the base body, and a fastening switch, wherein the base body has an accommodating cavity for receiving the ball body of the retaining connector, wherein the support rod is protruded outward from the ball body which is retained in the accommodating cavity.

According to an embodiment of the present invention, the retaining supporter has a slot formed at an upper end of the base body of the retaining supporter and is communicated to the accommodating cavity.

According to an embodiment of the present invention, the base comprises a connecting element and a supporting element, wherein the connecting element is pivotally connected to the supporting element, wherein the supporting element is mounted to the supporting assembly, wherein the retaining supporter of the retainer is mounted on the connecting element so as to mount and support the retainer by the connecting element.

According to an embodiment of the present invention, the connecting element is able to rotate 180° with respect to the supporting element.

According to an embodiment of the present invention, the connecting element is supported by the supporting element in a manner that the connecting element is able to rotate in a plane with respect to a pivot point, wherein the retaining connector is supported by the retaining supporter in a manner that the retaining connector is able to rotate in a space with respect to a fulcrum on the retaining supporter, so that illumination direction of light emitted by the lighting body is able to to be adjusted to any direction based on adjustment by the retainer and the base.

According to an embodiment of the present invention, an rotating angle θ of the connecting element of the base with respect to the pivot point is in a range of $-90°\leq\theta\leq90°$, wherein the retaining connector is supported by the retaining supporter and a rotation angle γ of the retaining connector in the space is in a range of $-60°\leq\gamma\leq60°$.

According to an embodiment of the present invention, the base is supported on a top of the supporting assembly, and by adjusting an angle between the connecting element and the supporting element, the lighting body is able to extend outward along an extending direction of the connecting element with a connection between the connecting element and the supporting element as a fulcrum, allowing the lighting body to be supported at one of an outer side, an upper side, and an obliquely upward side of the supporting assembly, wherein the retaining supporter of the retainer is fixed to the connecting element, and the retaining connector of the retainer pivotally and axially rotatably move at any angle within a conical space with respect to a center of the retaining supporter, so as to adjust an illumination direction and angle of the lighting body.

According to an embodiment of the present invention, the connecting element comprises a locking member and a pivot member coupled to the locking member, wherein the locking member is connected to the retaining supporter of the retainer, wherein the pivot member is pivotally connected to the supporting element.

According to an embodiment of the present invention, the supporting assembly comprises a telescoping rod and a stand, wherein the base of the lighting assembly is arranged on the telescoping rod of the supporting assembly, wherein the stand is provided on a bottom of the telescoping rod to support the telescoping rod.

According to an embodiment of the present invention, the stand, which is detachably disposed at the bottom of the telescoping rod, comprise at least three supporting legs and at least three leg braces, wherein one end of each supporting leg is slidably disposed on the telescoping rod, and one end of each leg brace is provided on the telescoping rod and is arranged below the corresponding supporting leg, the other end of each leg brace is provided on the corresponding supporting leg, and the corresponding supporting leg is supported by the leg brace in such a manner that the three supporting legs is able to be unfolded and extend outward to form a triangular support structure, wherein the supporting assembly further comprise a disengagement prevention member for retaining the at least three leg braces of the stand at the bottom of the telescoping rod.

According to an embodiment of the present invention, the device holder comprises a mounting member and a device clamp, wherein the mounting member is detachably mounted to the telescoping rod, wherein the device clamp is pivotably connected to the mounting member, and an shooting angle of the photographing device is adjusted by adjusting a rotation angle between the device clamp and the mounting member, wherein the device clamp comprises a fixed part and at least one movable part, wherein the at least one movable part is capable of moving telescopically with respect to the fixed part, and a holding space is formed between the fixed part and the movable part, and a space size of the holding space of the device clamp is adjusted by adjusting a position of the movable part, so as to fit with different sizes of the photographing devices.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
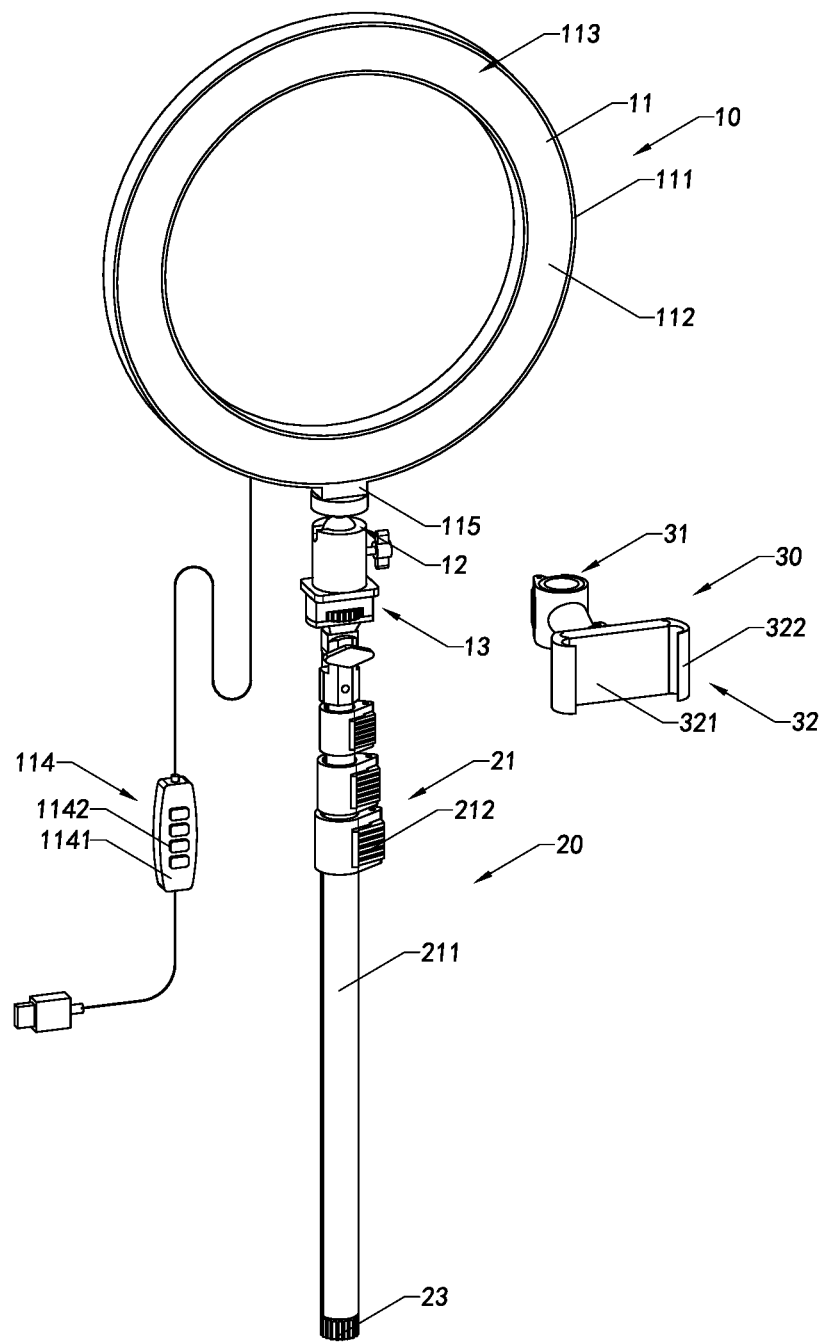
FIG. 1 is a perspective view of a fill light according to a preferred embodiment of the present invention.
Figure 2A:
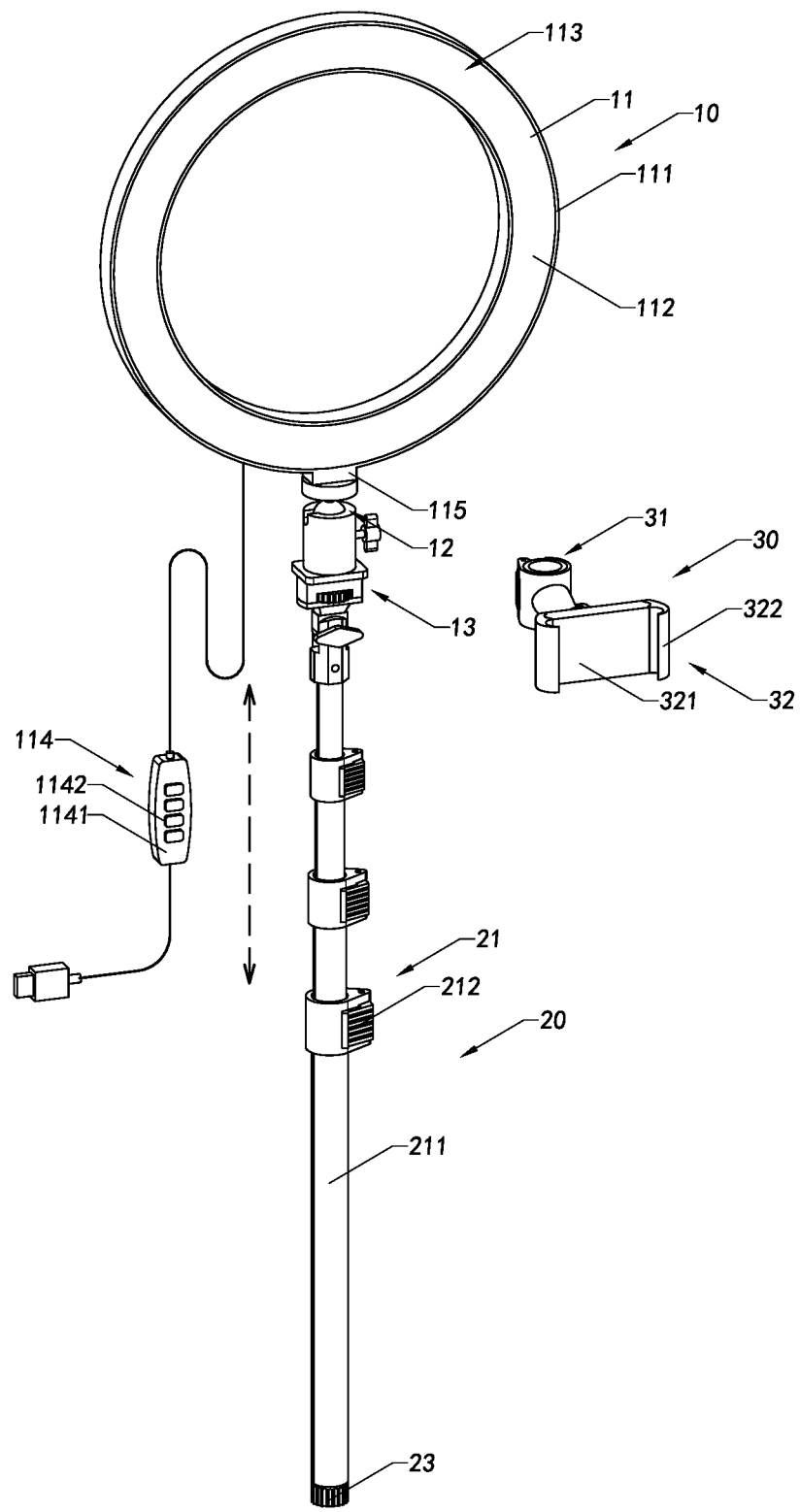
FIG. 2A and FIG. 2B are respectively perspective views illustrating the fill light being in a stretching state and in a retracting state according to the above preferred embodiment of the present invention.
Figure 2B:
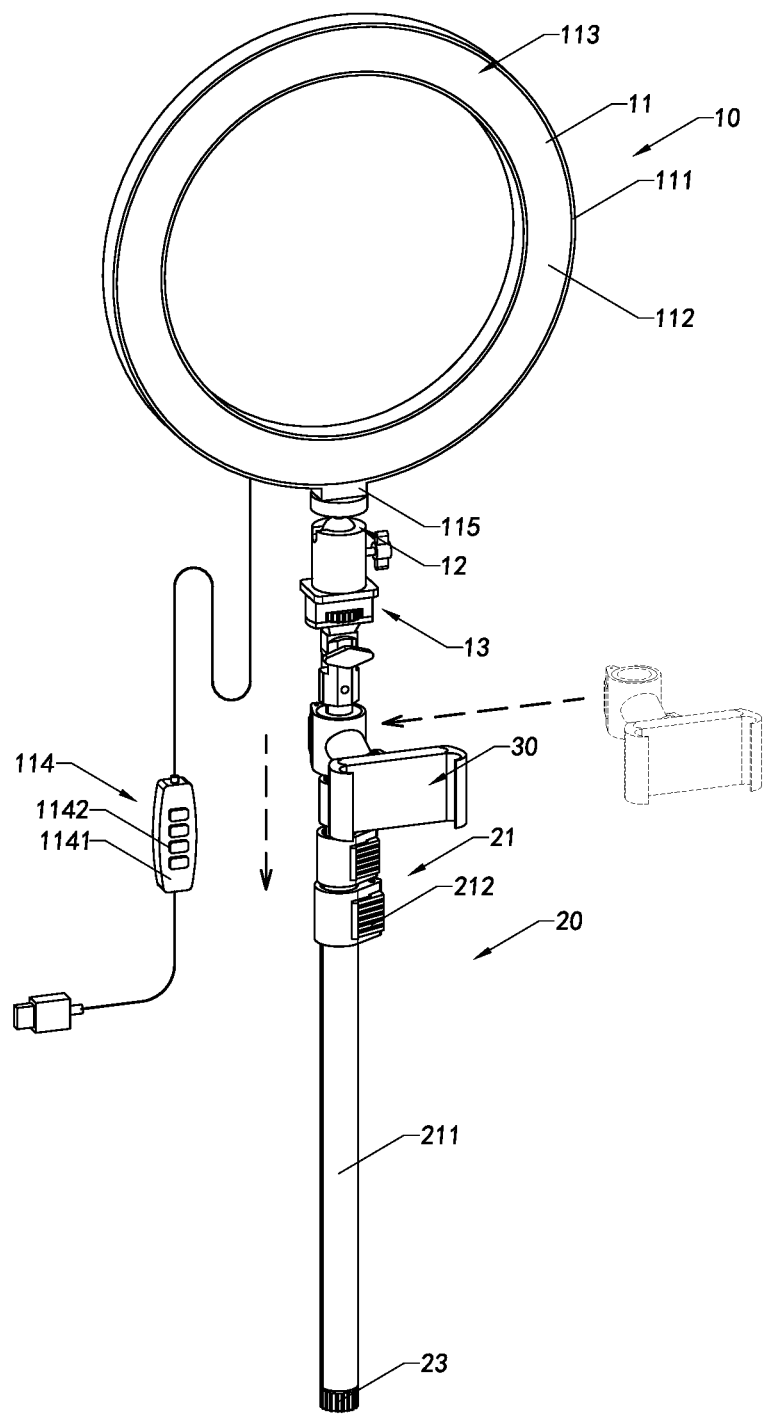
Figure 3:
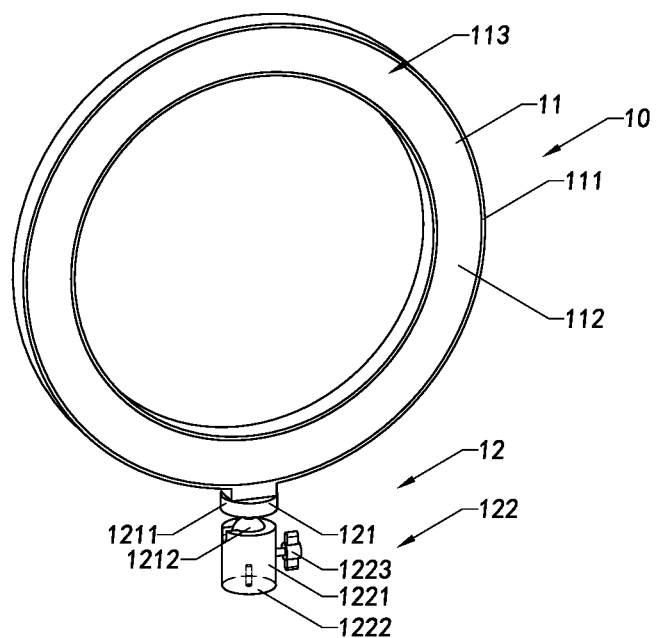
FIG. 3 is a perspective view of a lighting assembly of the fill light according to the above preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

Referring to FIG. 1 to FIG. 11 of the drawings, a fill light according to a preferred embodiment of the present invention is illustrated. The fill light comprises a lighting assembly 10, a supporting assembly 20 and at least one device holder 30, wherein the lighting assembly 10 and the device holder 30 can be coupled to the supporting assembly 20, so that the supporting assembly 20 supports the lighting assembly 10 and the device holder 30. It is worth mentioning that, in this preferred embodiment of the present invention, the device holder 30 is used to fix and support a photographing device, such as a mobile phone, a camera, a tablet computer, a microcomputer, a camera, and the like. In other words, the photographing device is hold to the supporting assembly 20 by the device holder 30. The lighting assembly 10 is adjustably disposed at one end of the supporting assembly 20, and the lighting assembly 10 can be electrically conducted so that is can emit light in a predetermined direction to form a fill lighting area. The lighting assembly 10 is arranged on top of the supporting assembly 20, so that the lighting assembly 10 is supported by the supporting assembly 20 in such a manner that the position and/or orientation of the lighting assembly 10 is adjusted to adjust the position and angle of the fill lighting area of the lighting assembly 10, so that the photographing device hold by the device holder 30 shoots an object located in the fill lighting area.

The device holder 30 is adjustably disposed on the supporting assembly 20, wherein the device holder 30 is located below the lighting assembly 10, and the device holder 30 and the lighting assembly 10 are independent components that the device holder 30 and the lighting assembly 10 can be adjusted independently, so that the user can obtain the required shooting directions by adjusting the lighting assembly 10 and/or the device holder 30 based on the shooting needs.

The device holder 30 is supported under the lighting assembly 10 by the supporting assembly 20. When a user uses the photographing device to take a selfie or live broadcast, the user's eyes face the photographing device, so as to avoid the light emitted by the lighting assembly 10 from directly projecting towards the user's eyes. The device holder 30 and the lighting assembly 10 can be adjusted independently, and the device holder 30 is supported under the lighting assembly 10 by the supporting assembly 20. Therefore, when the user adjusts the lighting assembly 10, the posture of the device holder 20 does not change, or when the user adjusts the posture of the device holder 30, the illumination direction and angle of the lighting assembly 10 do not change. It is helpful for the user to adjust the scene illumination demand required by the shooting device according to the actual demand. On the other hand, the device holder 30 is supported below the lighting assembly 10 by the supporting assembly 20, so that it is beneficial to lower the center of gravity of the entire fill light, especially when the photographing device is retained and hold by the device holder 30, the center of gravity of the fill light assembled with the photographing device is further lowered, so that the stability of the fill light is further enhanced.

The lighting assembly 10 comprises a lighting body 11, a retainer 12 and a base 13, wherein the lighting body 11 is pivotally coupled to the retainer 12, the retainer 12 can be adjusted to adjust the illumination direction of the lighting body 11, the retainer 12 can be mounted to the base 13, and then the base 13 fixes the retainer 12 on top of the supporting assembly 20. Preferably, in this preferred embodiment of the present invention, the lighting body 11, the retainer 12 and the base 13 are detachably connected, and the retainer 12 and the base 13 can be adjusted to adjust the illumination direction of the lighting body 11.

The lighting body 11 may be fixed to the retainer 12, so that the lighting body 11 is supported and retained by the retainer 12. Accordingly, the retainer 12 holds the lighting body 11 in position, so that the lighting body 11 illuminates light in a predetermined direction and angle. In other words, the lighting body 11 is positioned on the base 13 by the locator 12, and the illumination direction of the lighting body 11 is adjusted according to user requirements.

Preferably, in this preferred embodiment of the present invention, the retainer 12 is implemented as a pan-tilt fixture. As an example, in this preferred embodiment of the present invention, the retainer 12 may be, but not limited to, a spherical pan-tilt head, a hemispheric pan-tilt head, or a three-dimensional pan-tilt head holder, and the retainer 12 is used to mount and support the lighting body 11, and the illumination direction of the lighting body 11 is adjusted by adjusting the retainer 12.

The lighting body 11 is secured by the retainer 12, and emits light outwards when it is electrically conducted, so as to form the fill lighting area, so as to provide supplemental light required by the photographing device. Preferably, the lighting body 11 is in a circular structure, wherein the lighting body 11 emits light to the fill lighting area along the circular structure. The lighting body 11 further comprises a housing 111, a cover 112, and at least one lighting element 113 disposed between the housing 111 and the cover 112, wherein the lighting element 113 is arranged between the housing 111 and the cover 112 and can be electrically connected to a power source.

Preferably, in this preferred embodiment of the present invention, the housing 111 and the cover 112 are annular structures. More preferably, the diameter of the lighting body 11 is not less than 8 inches and not more than 15 inches.

It is worth mentioning that, in other alternative modes of the present invention, the shape and structure of the lighting body 11 may be implemented in other shapes, such as an oval structure, a disc-shaped structure, and the like. Therefore, in this preferred embodiment of the present invention, the shape and structure of the lighting body 11 are only used as examples, but not limitations.

The housing 111 and the cover 112 of the lighting body 11 are coupled to each other to form an accommodating cavity for receiving the lighting element 113. The lighting body 11 further comprises a control unit 114 which is electrically connected to the lighting element 113 and the working modes of the lighting element 113 are controlled by the control unit 114.

It is worth mentioning that, in the preferred embodiment of the present invention, the lighting body 11 has two or more working modes, and can be switched between different working modes, so as to irradiate different fill light patterns toward the fill lighting area. As an example, in this preferred embodiment of the present invention, the lighting element 113 of the lighting body 11 is controlled by the control unit 114 to have a white light working mode, a yellow light working mode, and a warm white working mode, when the lighting element 113 is in the white light working mode, the lighting element 113 projects white light or natural light; when the lighting element 113 is in the yellow light working mode, the lighting element 113 projects yellow light; when the lighting element 113 is in the warm white working mode, the lighting element 113 projects warm white light. It can be understood by those skilled in the art that the user can select the desired working mode of the lighting body 11 based on the photographing mode of the photographing device or the current ambient light, so that the light emitted by the lighting element 113 is suitable for the needs of the photographing device.

It is worth mentioning that, in this preferred embodiment of the present invention, the control unit 114 can adjust the light intensity of the lighting element 113 to adjust the size of the fill lighting area and the light irradiation distance. It is worth mentioning that when the photographing device photographs objects or people at different distances, the light intensity of the lighting element 113 is adjusted by the control unit 114, so that the light emitted by the lighting body 11 and projected toward the fill lighting area is suitable for the shooting and photographing device to shoot.

Figure 5A:
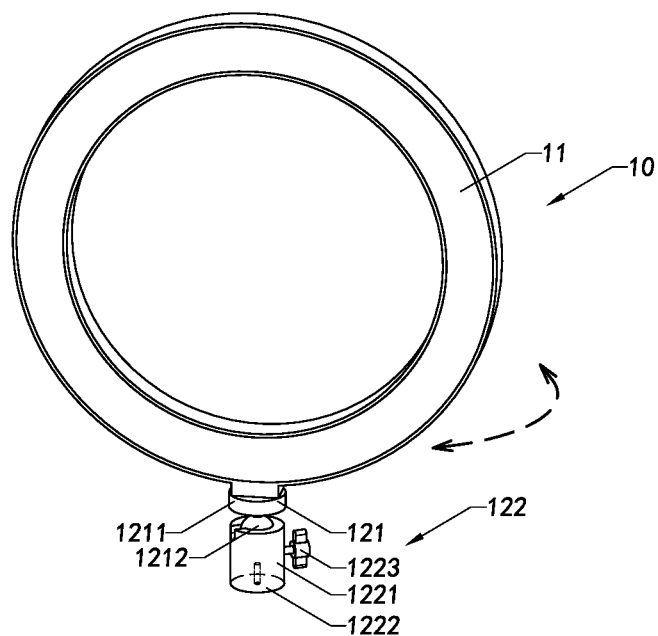
FIGS. 5A and 5B are respectively perspective views illustrating the lighting assembly of the fill light being in two illumination states according to the above preferred embodiment of the present invention.
Figure 5B:
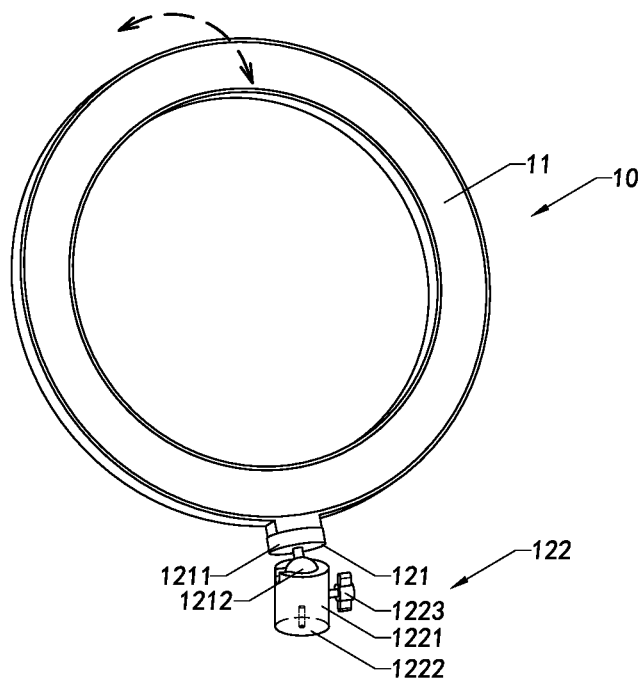
Figure 6:
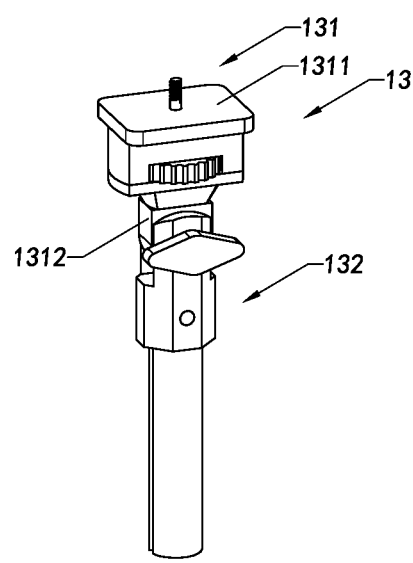
FIG. 6 is a perspective view illustrating a device holder of the fill light according to the above preferred embodiment of the present invention.
Figure 7A:
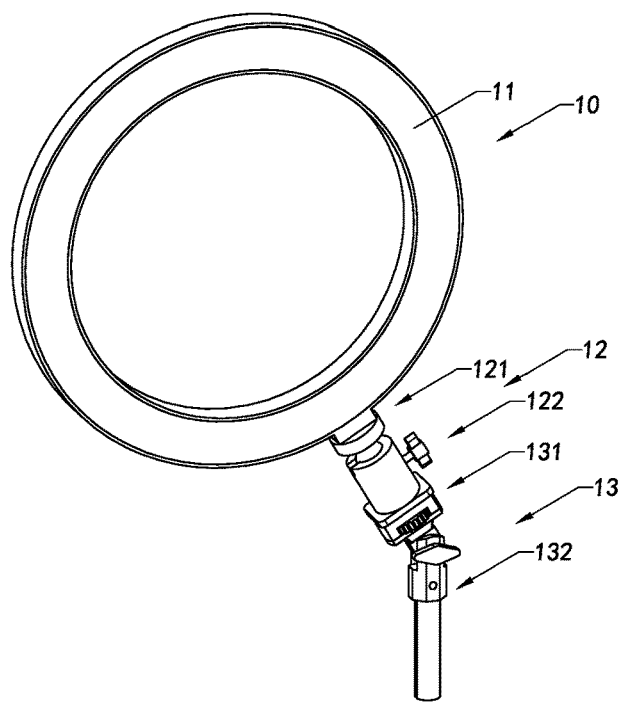
FIGS. 7A and 7B are respectively perspective views illustrating two different relative positions between the lighting assembly and the device holder of the fill light according to the above preferred embodiment of the present invention.
Figure 7B:
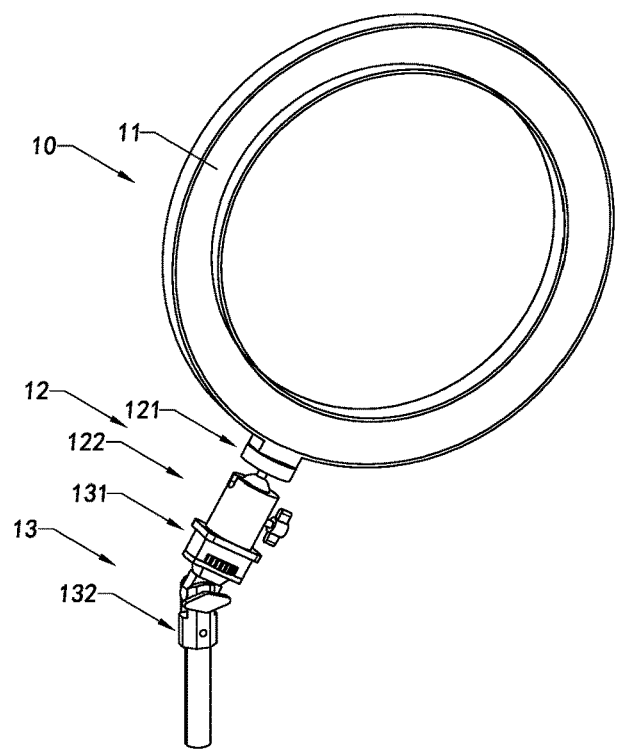
Figure 8:
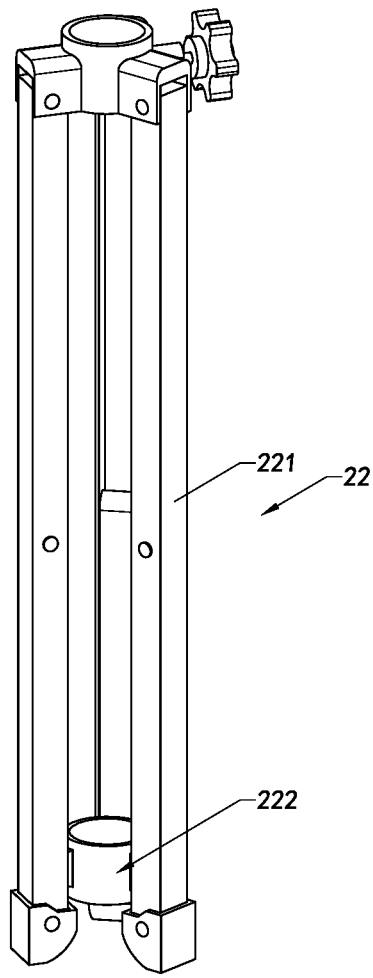
FIG. 8 is a perspective view of a supporting assembly of the fill light according to the above preferred embodiment of the present invention.
Figure 9A:
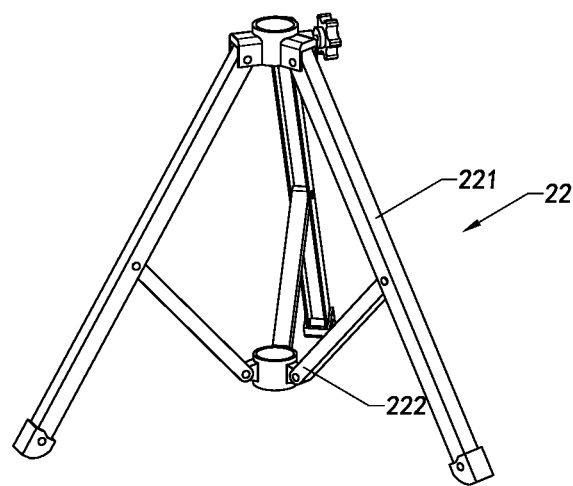
FIGS. 9A and 9B are respectively perspective views illustrating the supporting assembly of the fill light according to the above preferred embodiment of the present invention.
Figure 9B:
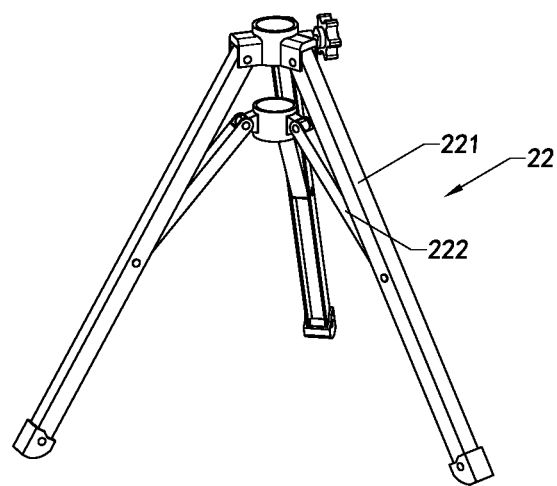
Figure 10A:
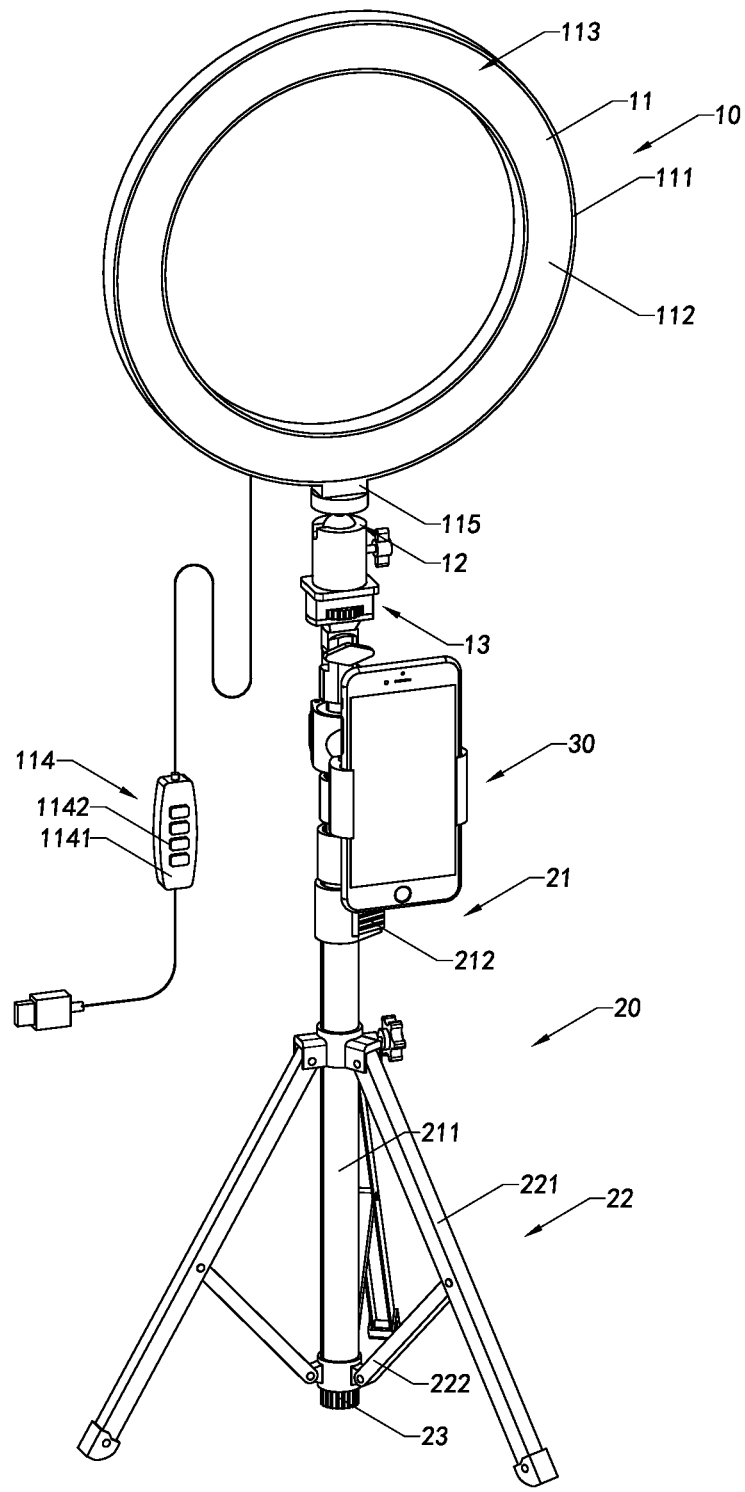
FIGS. 10A to 10D are respectively perspective views illustrating the applications states of the fill light according to the above preferred embodiment of the present invention.
Figure 10B:
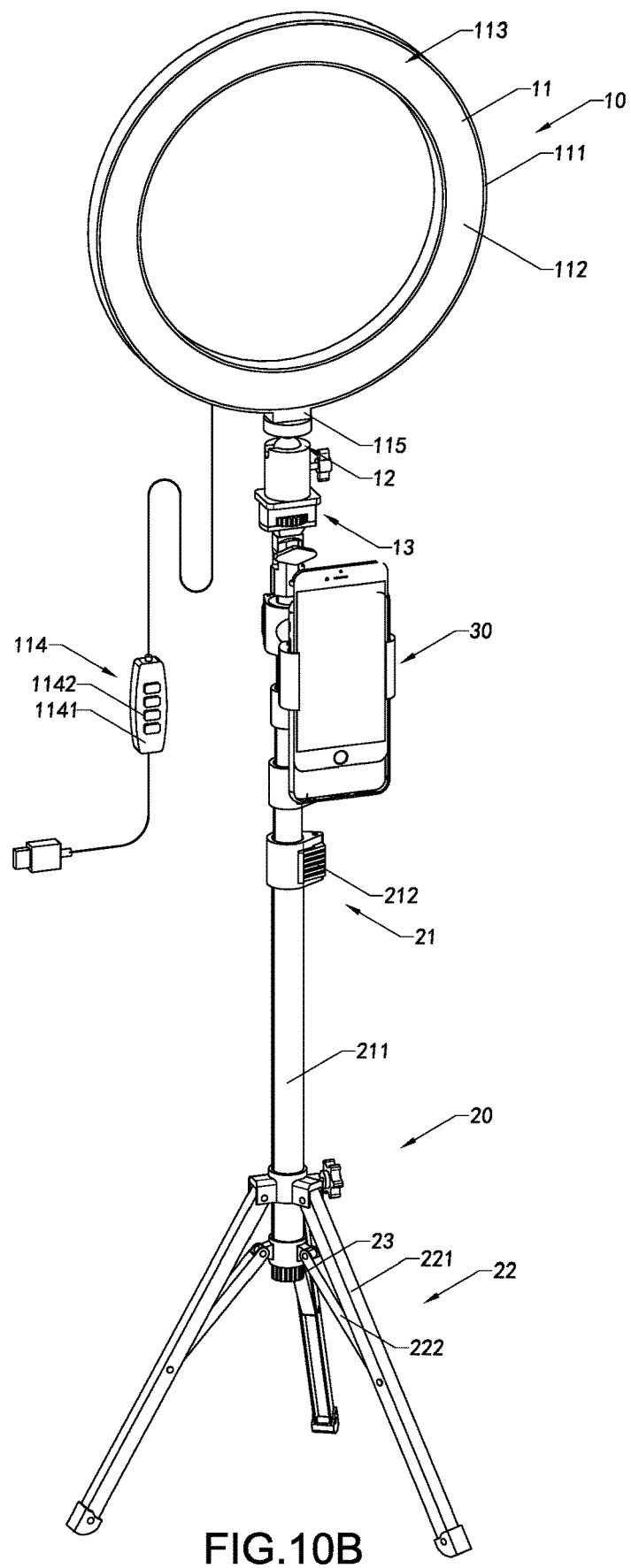
Figure 10C:
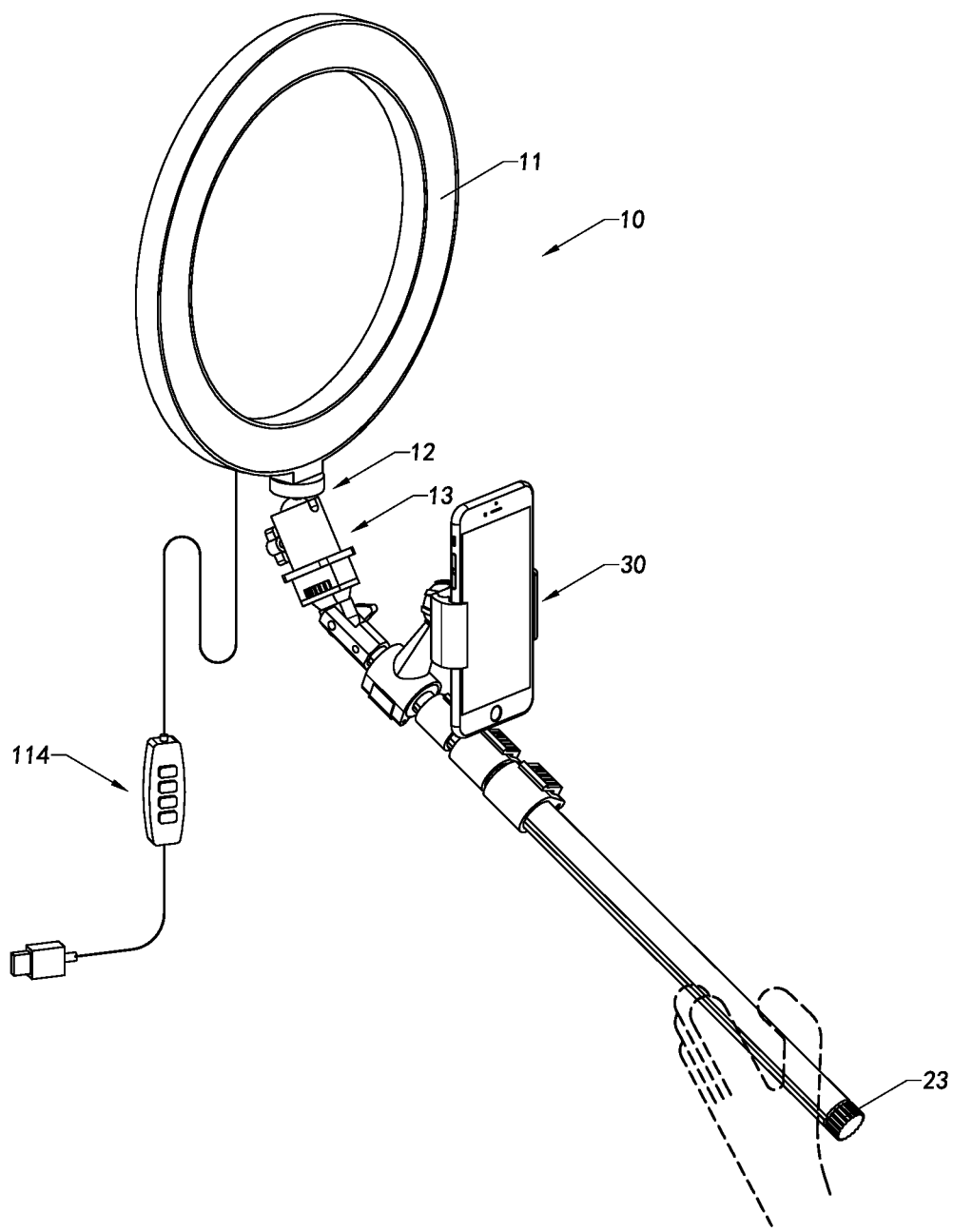
Figure 10D:
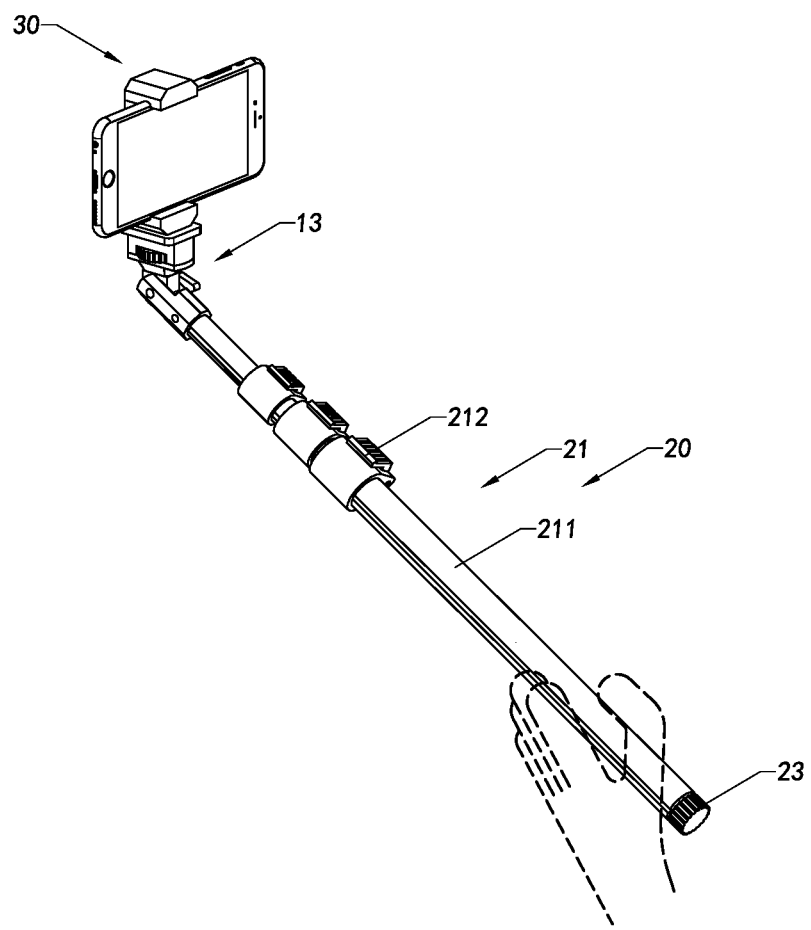

As shown in FIG. 5A and FIG. 5B, the at least one lighting element 113 of the lighting body 11 provides a light condensing mode, a parallel light mode and an astigmatic mode under the control of the control unit 114, and the lighting element 113 can be switched among the light condensing mode, the parallel light mode and the astigmatic mode. When the control unit 114 sets the lighting element 113 to be in the light condensing mode, the light emitted by the lighting element 113 converges toward a central axis of the lighting body 11. Preferably, in this preferred embodiment of the present invention, the lighting body 11 is a circular lighting device, wherein the light emitted by each of the lighting elements 113 of the lighting body 11 converges toward the central axis of the lighting body 11, so as to reduce an area range of the fill lighting area formed by the illumination of the lighting body 11, and the light beams from the lighting element 113 of the lighting body 11 is concentrated, so that the lighting body 11 can irradiate and illuminate the object at a distance, and thus the fill light is suitable for long distance fill light illumination.

It is worth mentioning that, in this preferred embodiment of the present invention, when the lighting element 113 is in the light condensing mode, the angle $\alpha$ between the light emitted by the lighting element 113 and the central axis of the lighting body 11 is $0°<\alpha<10°$. It can be understood by those skilled in the art that when the lighting element 113 is in the light condensing mode, the light emitted by the lighting element 113 converges in a specific direction, so that it is beneficial to the focusing of the light, and it is suitable for providing illumination with a relatively small focusing angle at a relatively long distance for shooting.

When the at least one lighting element 113 of the lighting body 11 is in the parallel light mode, the light emitted by the lighting element 113 is parallel or substantially parallel to the central axis of the lighting body 11.

When the at least one lighting element 113 of the lighting body 11 is in the astigmatism mode under the control of the control unit 114, that is, the light emitted by the lighting element 113 projects outward from the lighting body 11 in a radiating pattern or a scattering pattern, so that the area size of the fill lighting area formed by the illumination of the lighting body 11 is increased, and the convergence of light is reduced. It is worth mentioning that, since the light irradiated by the lighting element 113 of the lighting body 11 in the astigmatism mode is scattered outward, the light intensity of the light is relatively weak, so that is suitable for the user to take selfies at a close distance or to use the photographing device to take large pictures or video with wide shooting angles. Preferably, when the lighting element 113 is in the astigmatism mode, the angle $\alpha$ between the light emitted by the lighting element 113 and the central axis of the lighting body 11 is $0°<\alpha<10°$. In particular, when the user uses the fill light to provide fill lighting for the photographing device at a relatively small distance, the lighting element 113 of the lighting body 11 works in the astigmatism mode, the light emitted by the lighting element 113 scatters outwards, so as to prevent the light from being concentrated on the user's face or eyes.

Preferably, in this preferred embodiment of the present invention, the lighting element 113 of the lighting body 11 may be, but not limited to, an LED light source.

The control unit 114 of the lighting body 11 is electrically connected to the lighting element 113 through wires, and the control unit 114 controls the conduction state and lighting mode of the lighting element 113. Correspondingly, the control unit 114 further comprises a switch element 1141 and a circuit control board 1142, wherein the switch element 1141 is arranged on the circuit control board 1142, and the lighting element 113 is controlled by the switch element 1141. The circuit control board 1142 is implemented as an electrical circuit board, and the circuit control board 1142 controls the working modes of the lighting element 113 during working. For example, adjusting the lighting element 113 from the parallel light mode to the light condensing mode, or switching from the white light working mode to the yellow light working mode, etc.

The lighting body 11 further comprises a fixing unit 115 disposed at a lower end of the housing 111, and the lighting body 11 is fixed to the retainer 12 through the fixing unit 115. Preferably, in this preferred embodiment of the present invention, the fixing unit 115 and the housing 111 are integrated, and the fixing unit 115 is formed at the lower end of the housing 111.

The lighting body 11 is fixed and supported by the retainer 12, and the illumination direction of the lighting body 11 is adjusted by the retainer 12, so as to meet the light requirements of the photographing device. Preferably, the retainer 12 fixes and supports the lighting body 11 and allows the lighting body 11 to rotate 360 degrees based on the posture of the retainer 12, so to adjust the light illumination angle of the lighting body 11.

The retainer 12 can be implemented as a spherical pan-tilt head or a three-dimensional pan-tilt head, and the specific implementation of the retainer 12 is merely illustrative, not limiting.

Figure 4:
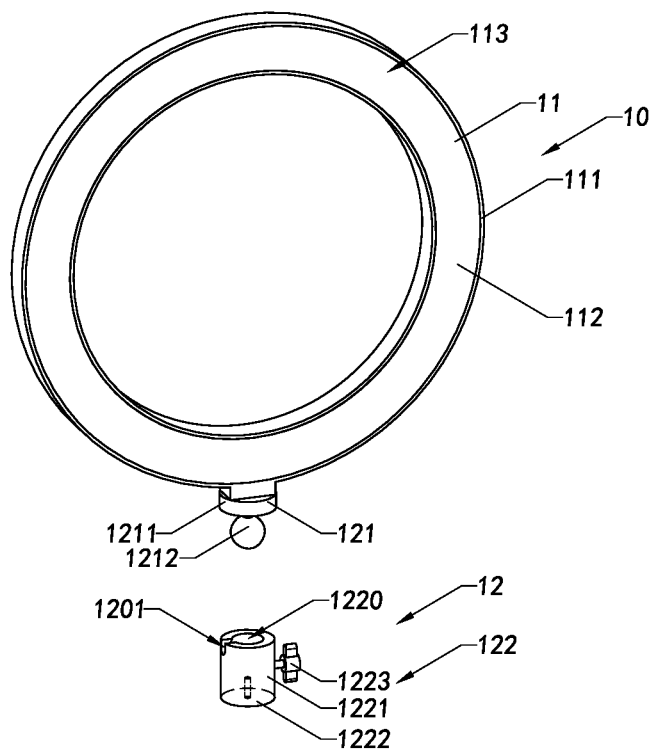
FIG. 4 is an exploded view of the lighting assembly of the fill light according to the above preferred embodiment of the present invention.

As shown in FIG. 4, the retainer 12 comprises a retaining connector 121 and a retaining supporter 122, wherein the lighting body 11 can be mounted to the retaining connector 121 of the retainer 12, and the retaining connector 121 is pivotally disposed on the retaining supporter 122 to allow the retaining connector 121 to rotate. The retaining connector 121 further comprises a support rod 1211 and a ball body 1212 disposed at one end of the support rod 1211. The retaining supporter 122 comprises a base body 1221, a base seat 1222 at a lower end of the base body 1221, and a fastening switch 1223, wherein the base body 1221 is provided with an accommodating cavity 1220 for accommodating the ball body 1212 of the retaining connector 121. The support rod 1211 of the retaining connector 121 is protruded outward from the ball body 1212. The base seat 1222 is located at the lower end of the base body 1221, and the accommodating cavity 1220 is defined by the base seat 1222 and the base body 1221. The fastening switch 1223 is operatively coupled with the base seat 1222 in such a manner that the fastening switch 1223 can drive the base seat 1222 to move forward and backward. When the fastening switch 1223 is being operated and fastened, the base seat 1222 make the accommodating cavity 1220 to shrink, so that the ball body 1212 of the retaining connector 121 is fastened in the accommodating groove 1220. When the fastening switch 1223 is released, the base seat 1222 moves in the opposite direction, so that the volume of the accommodating cavity 1220 increases, so as to allow the ball body 1212 of the retaining connector 121 to move in the accommodating cavity 1220 to adjust the support direction of the support rod 1211.

It is worth mentioning that, in this preferred embodiment of the present invention, the retainer 12 is used to mount and support the lighting body 11, and the lighting body 11 can be pivotally rotate with the ball body 1212 of the retaining connector 121 as a rotating center, or rotate with the support rod 1211 of the retaining connector 121 of the retainer 12 as a rotating axis, so as to adjust the illumination direction and angle of the lighting body 11.

The retaining supporter 122 is further provided with a slot 1201, the slot 1201 of the retaining supporter 122 is formed in the base body 1221 of the retaining supporter 122, and the slot 1201 is communicated with the slot 1201 which s formed in an upper end of the base body 1221, and the support rod 1211 of the retaining connector 121 can be adjusted to align with the slot 1201 so that the support rod 1211 is being in a horizontal position. It can be understood that when the support rod 1211 of the retaining connector 121 is placed in the slot 1201, the ling body 11 is extending outward along the support rod 1211 of the retaining connector 121, and the lighting body 11 can be rotated axially along the support rod 1211 of the retaining connector 121. Therefore, the lighting body 11 can be adjusted to a horizontal structure, and the lighting body 11 can be supported by the retainer 12 to rotate with respect the horizontal direction to adjust the illumination condition required by the photographing device.

In this preferred embodiment of the present invention, when the support rod 1212 of the retaining connector 121 of the retainer 12 is pivoted to the slot 1201, the user can rotate the retaining connector 121, so as to rotate the lighting body 11 at any angle along the axial direction of the support rod 1212 to adjust the illumination direction of the lighting body 11. As an example, the lighting body 11 can be adjusted to be at a lateral side of the supporting assembly 20, and illuminates toward the space marked on the side of the supporting assembly 20, so that the fill lighting area is located at one side of the photographing device, in order to provide make-up light in the space at the side of the photographing device.

The base 13 is mounted to the supporting assembly 20, and the retainer 12 is detachably connected to the supporting assembly 20 through the base 13. Preferably, in this preferred embodiment of the present invention, the base 13 is pivotally mounted on one end of the supporting assembly 20, and the illumination direction of the lighting body 11 is further adjusted through the base 13.

Correspondingly, the base 13 comprises a connecting element 131 and a supporting element 132, wherein the connecting element 131 is pivotally connected with the supporting element 132, and one end of the supporting element 132 is mounted to the supporting assembly 20. The retaining supporter 122 of the retainer 12 may be connected to the connecting element 131, so that the retainer 12 is held and supported by the connecting element 131.

The connecting element 131 is pivotally coupled with the supporting element 132, and the connecting element 131 and the supporting element 132 are detachably locked by a locking unit. When the locking unit locks the connecting element 131 and the supporting connecting unit 132, the relative position between the connecting element 131 and the supporting element 132 is fixed and the connecting element 131 is supported by the supporting element 132. After the locking unit is unlocked, the connecting element 131 can be rotated with respect to the axis of the locking unit, so as to adjust the rotation direction of the connecting element 131.

It is worth mentioning that, in this preferred embodiment of the present invention, the connecting element 131 can rotate 180° with respect to the supporting element 132. Therefore, the lighting body 11 can be adjusted to be parallel or even upside down by adjusting the rotation angles of the connecting element 131 with respect to the supporting element 132 of the base 13, so as to further adjusting the illumination direction of the lighting body 11 to form the fill lighting area in different ways.

Therefore, when the connecting element 131 and the supporting element 132 of the base 13 are fixed at an angle, by adjusting the retaining connector 121 and the retaining supporter 122 of the retainer 12, it is able to set the illumination direction and angle of the lighting body 11. Correspondingly, when the retaining connector 121 and the retaining supporter 122 of the retainer 12 are fixed at a predetermined angle, the illumination direction and angle of the lighting body 11 are adjusted by adjusting the angles of the connecting element 131 with respect to the supporting element 132 of the base 13.

Through the base 13 and the retainer 12, the lighting body 11 can be adjusted to rotate at an angle within a spatial range based on the connection position of the connecting element 131 and the supporting element 132, so as to facilitate the adjustment of the fill lighting required by the photographing device.

The connecting element 131 of the base 13 is supported by the supporting element 132, and rotates in a plane direction based on a pivot point. When the retainer 12 is fixed by the connecting element 131, the retaining connector 121 can be supported by the retaining supporter 22 and perform a rotational movement in the spatial direction based on a support point, so that the lighting body 11 is supported and adjusted by the retainer 12 and the base 13, so that its illumination direction can be adjusted to any direction in space, so as to adjust the illumination scene required by the photographing device according to the requirements. Preferably, in this preferred embodiment of the present invention, the rotating angle $\theta$ of the connecting element 131 of the base 13 with respect to the pivot point is in the range of $-90° \leq \theta \leq 90°$. The retaining connector 121 is supported by the retaining supporter 122, wherein the rotation angle $\gamma$ of the retaining connector 121 in the spatial direction is in the range of −60°≤γ≤60°. It can be understood that, in this preferred embodiment of the present invention, the adjustable angles of the base 13 and the retainer 12 are only used as an example, rather than a limitation.

It is worth mentioning that the base 13 is supported on the top of the supporting assembly 20, and by adjusting the angle between the connecting element 131 and the supporting element 132, the lighting body 11 can extend outward along the extending direction of the connecting element 131 with the connection between the connecting element 131 and the supporting element 132 as a fulcrum, allowing the lighting body 11 to be supported at an outer side, or an upper side, or an obliquely upward side of the supporting assembly 20. The retaining supporter 122 of the retainer 12 is fixed to the connecting element 131, and the retaining connector 121 of the retainer 12 pivotally and axially rotatably move at any angle within a conical space with respect to a center of the retaining supporter 122, so as to adjust the illumination direction and angle of the lighting body 11.

The connecting element 131 of the base 13 comprises a locking member 1311 and a pivot member 1312 coupled to the locking member 1311, wherein the locking member 1311 can be fixedly connected to the retaining supporter 122 of the retainer 12, the pivot member 1312 is pivotally connected to the supporting element 132. The locking member 1311 is fixed to a lower end of the retaining supporter 122 by means of screw connection or snap connection, and the retainer 12 is supported by the locking member 1311.

The locking member 1311 is coupled to one end of the pivoting member 1312, and the retainer 12 is fixed to a top of the pivot member 1312 through the locking member 1311. The other end of the pivot member 1312 is pivotally connected to the supporting element 132, so that the pivot member 1312 can be retained and mounted to the supporting element 132, and the retainer 12 is fixedly supported by the pivot member 1312. The supporting element 132 is fixed on a top of the supporting assembly 20, and the base 13 is supported by the supporting assembly 20.

The supporting assembly 20 supports the lighting assembly 10 in a height-adjustable manner so as to support the lighting assembly 10 at different heights to form the fill lighting area. The supporting assembly 20 further has a storing state and an unfolded state, and the supporting assembly 20 is able to be switched between the storing state and the unfolded state. When the supporting assembly 20 is in the storing state, the supporting assembly 20 can be folded and collapsed to reduce the overall volume of the supporting assembly 20 and facilitate storage. When the supporting assembly 20 is in the unfolded state, the supporting assembly 20 can be unfolded to support the lighting assembly 10 to allow the lighting assembly to stretch upward, so as to adjust the height of the lighting assembly 10.

The supporting assembly 20 comprises a telescoping rod 21 and a stand 22, wherein the base 13 of the lighting assembly 10 is provided on the telescoping rod 21 of the supporting assembly 20, and the stand 22 is provided on the telescoping rod 21 of the supporting assembly 20. The stand 22 is coupled and connected at a bottom of the telescoping rod 21 to supports the telescoping rod 21.

Preferably, in this preferred embodiment of the present invention, the stand 22 is implemented as a tripod support structure, wherein the stand 22 is supported at the bottom of the telescoping rod 21, and the stand 22 has a folded storing state and an deployment and unfolded supporting state, when the stand 22 is in the folded and storing state, the stand 22 is stored at the bottom of the telescoping rod 21, so as to reduce the space occupied by the stand 22 and to facilitate th storage. When the stand 22 is in the deployment and unfolded supporting state, the stand 22 is unfolded outward from the telescoping rod 21 to form a three-legged supporting structure, so as to stably support the telescoping rod 21.

In this preferred embodiment of the present invention, the device holder 30 is arranged on the telescoping rod 21 of the supporting assembly 20, and the position of the device holder 30 is adjusted by adjusting an extension height of the telescoping rod 21, so that the position of the photographing device fixed by the device holder 30 is adjusted. Preferably, in this preferred embodiment of the present invention, the device holder 30 is detachably connected to the telescoping rod 21 of the supporting assembly 20, and the user can install or remove the device holder 30 as required.

The telescoping rod 21 of the supporting assembly 20 comprises two or more telescoping rod members 211 and at least one fixing member 212 for fixing the telescoping rod members 211, wherein the telescoping rod member 211 is implemented as a hollow rod like structure. Two adjacent telescoping rod members 211 are sleeved together, and one of the telescoping rod member 211 can be telescopically arranged on the other adjacent telescoping rod member 211, so as to adjust the height of the lighting assembly 10.

The fixing member 212 is used for fixing a relative position between the two adjacent telescoping rod members 211 to maintain the height of the telescoping rod 21. The fixing member 212 is disposed at one end of the telescoping rod member 211, and fixes the relative position between the two adjacent telescoping rod members 211 by preventing the relative movement of the two adjacent telescoping rod members 211.

The stand 22 is disposed at the bottom of the telescoping rod 21, and in the unfolded state, the telescoping rod 21 is supported by the stand 22 to stably support the lighting assembly 10. The stand 22 comprise at least three supporting legs 221 and at least three leg braces 222, wherein one end of the supporting leg 221 is slidably disposed on the telescoping rod 21, and one end of the leg brace 222 is provided on the telescoping rod 21 and is arranged below the supporting leg 221, the other end of the leg brace 222 is provided on the corresponding supporting leg 221, and the corresponding supporting leg 221 is supported by the leg brace 222 in such a manner that the three supporting legs 221 can be unfolded and extend outward to form a triangular support structure. When the stand 22 moves downward along the telescoping rod 21 and is deployed and unfolded, the supporting legs 221 of the stand 22 are supported by the leg braces 222 and are supported outward from the bottom end of the telescoping rod 21, so that a triangular tripod supporting structure is formed.

The stand 22 is detachably arranged on one end of the telescoping rod 21, and the user can install the stand 22 on the telescoping rod 21 according to the needs of use, or remove the stand 22 from the end of the telescoping rod 21. Preferably, in this preferred embodiment of the present invention, the stand 22 is disposed at the bottom end of the telescoping rod 21, and the stand 22 supports the telescoping rod 21 in an upright state. As an example, in this preferred embodiment of the present invention, each of the supporting legs 221 of the stand 22 is stretched outward from the bottom of the telescoping rod 21 to form a triangular supporting structure.

When used outdoors, or when moving the photographing device and the light fill device for providing fill lighting, the user can remove the stand 22 from the bottom end of the telescoping rod 21 so that the user can operate the telescoping rod 21 by hand.

The supporting assembly 20 further comprise a disengagement prevention member 23 disposed at the bottom of the telescoping rod 21 to limit and prevent the stand 22 from detaching from the telescoping rod 21. It is worth mentioning that, in this preferred embodiment of the present invention, the disengagement prevention member 23 is disposed on the bottom of the telescoping rod 21 so as to fix the stand 22 to the telescoping rod 21. The disengagement prevention member 23 can fix the stand 22 to the telescoping rod 21 by screwing or snap-fastening. Preferably, the disengagement prevention member 23 fixes one end of the leg brace 222 of the stand 22, and the corresponding supporting leg 221 can move up and down with respect to the leg brace 222 to adjust a deployment angle and unfolding state.

It can be understood that the fill light of the present invention can be used to provide fill lighting at a fixed position and also can provide fill lighting at a moving position. In other words, when the stand 22 of the supporting assembly 20 is removed from the bottom end of the telescoping rod 21, the user can hold the telescoping rod 21 to provide make-up light for the environment or the shooting scene. When the stand 22 is installed on the bottom of the telescoping rod 21, the fill light is suitable as a fill light for a fixed position. By adjusting the supporting legs 221 of the stand 22 and the leg braces 222, thee suitable height and supporting angle of the supporting assembly 20 can be achieved.

Preferably, in this preferred embodiment of the present invention, the distance from the lower end of each supporting leg 221 to the telescoping rod 21 is greater than 10 inches in the unfolded state of the stand 22, so that when the lighting assembly 10 is adjusted to any position and angle, a center of gravity of the lighting assembly 10 will not be deviated to a position at an outer side of the stand 22, so that it is beneficial to improve the structural stability of the fill light.

The device holder 30 can fix the photographing equipment to the telescoping rod 21 of the supporting assembly 20, and the installation height and direction angle of the device holder 30 can be adjusted according to actual use requirements. The device holder comprises a mounting member 31 and a device clamp 32, wherein the mounting member 31 is detachably mounted to the telescoping rod 21, the device clamp 32 is used for clamping and fixing the photographing device, and the device clamp 32 is pivotably connected to the mounting member 31, and the shooting angle of the photographing device is adjusted by adjusting the rotation angle between the device clamp 32 and the mounting member 31. Preferably, in this preferred embodiment of the present invention, the device holder 30 is implemented as a spherical pan-tilt head, a three-dimensional pan-tilt head or a hemispheric pan-tilt head. The device holder 30 allows the photographing device to be rotated at any angle and direction within a spatial range to adjusting the shooting angle of the photographing device.

The device clamp 32 has a holding space, and the photographing device can be clamped and retained in the holding space of the device clamp 32. The device clamp 32 comprises a fixed part 321 and at least a movable part 322, wherein the movable part 322 can move telescopically with respect to the fixed part 321, and the holding space is formed between the fixed part 321 and the movable part 322, the space size of the holding space of the device clamp 32 is adjusted by adjusting the position of the movable part 322, so as to fit with different sizes of photographing devices.

The mounting member 31 of the device holder 30 can be fixed at any position of the telescoping rod members 211 of the telescoping rod 21, so that the shooting angle and position of the photographing device can be adjusted by adjusting the device holder 30.

The mounting member 31 of the device clip 30 is pivotally connected to the device clamp 32. When the lighting assembly 10 is in a fixed position, the user can adjust the relative position between the mounting member 31 and the device clamp 32, so as to adjusting the shooting angle and position of the photographing device.

It is worth mentioning that, in this preferred embodiment of the present invention, the device holder 30 and the lighting assembly 10 can be adjusted with respect to each other. The user may fix the device holder 30 and adjust the position of the lighting assembly to adjust the fill lighting area formed by the illumination of the lighting assembly 10. Or the user may fix the lighting assembly 10 and adjust the device holder 30 to meet the illumination requirements of the photographing device.

Figure 11:
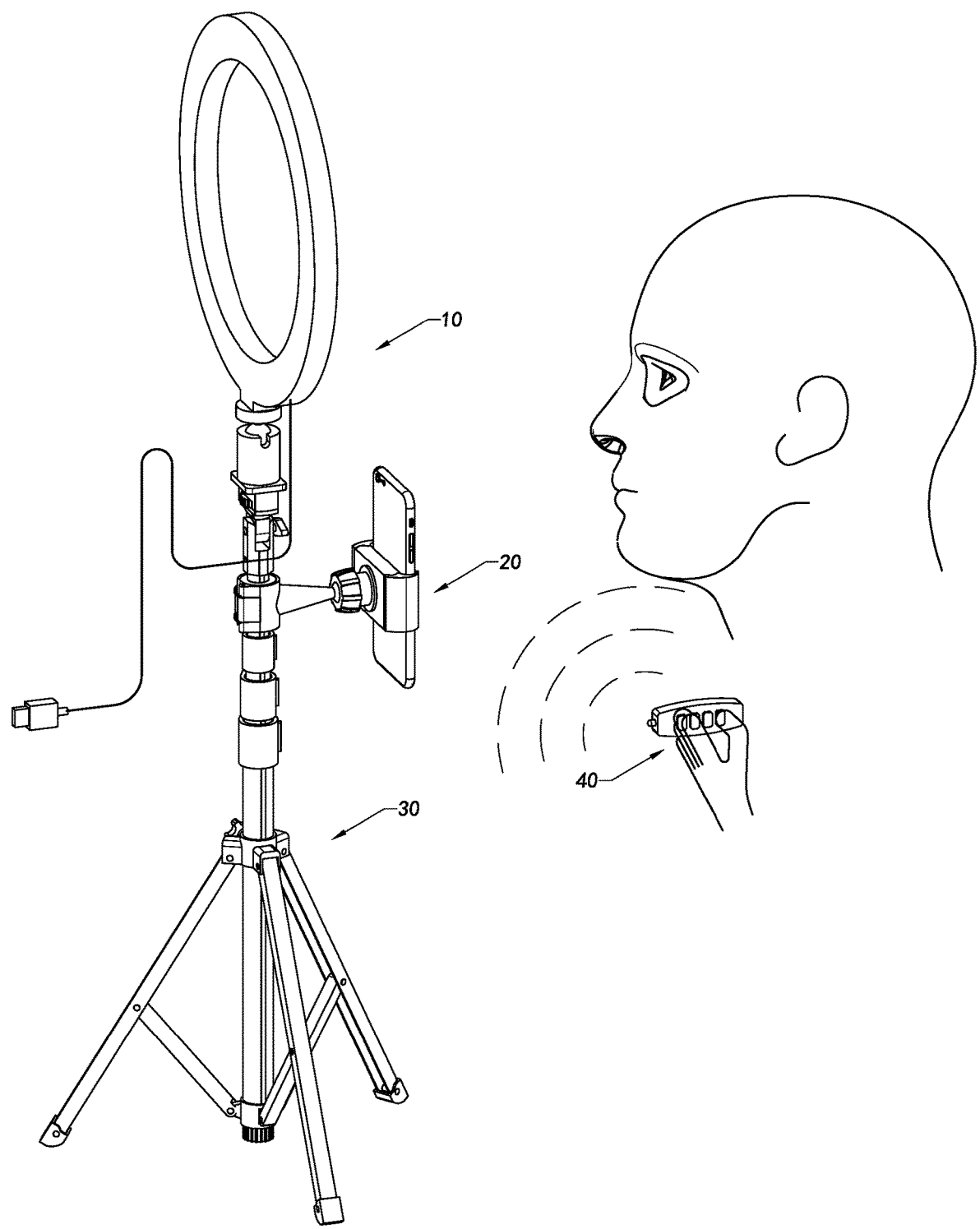
FIG. 11 is a perspective view illustrating a remote control of the fill light according to the above preferred embodiment of the present invention.

As shown in FIG. 11, the fill light further comprises a remote control unit 40 which is communicatively connected to the lighting assembly 10 to control the light intensity of the light emitted by the lighting body 11 of the lighting assembly 10. Preferably, in this preferred embodiment of the present invention, the remote control unit 40 is implemented as a Bluetooth controller, and the control unit 40 controls the light intensity and working modes of the lighting assembly 10.

The remote control unit 40 can also be communicatively connected to the photographing device. In other words, the remote control unit 40 and the photographing device are paired and connected to each other, so that the remote control unit 40 controls the operation of the photographing device, such as functioning as a control switch for taking pictures and recording videos.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A fill light for photographing device, comprising:
a lighting assembly;
a supporting assembly, wherein said lighting assembly is adjustably arranged on said supporting assembly; and
a device holder that is capable of being supported by said supporting assembly, wherein said lighting assembly comprises a lighting body, a retainer and a base, wherein said lighting body is pivotally coupled to said retainer, wherein said retainer is adjustably arranged on said base, wherein said base retains and supports said retainer on said supporting assembly, wherein said retainer supports said lighting body, so as to allow said lighting body to form a fill lighting area by illumination of said lighting body, wherein when the photographing device is held by said device holder, said lighting body provides fill lighting for the photographing device, wherein said retainer is selected from the group consisting of a spherical pan-tilt head, a hemispheric pan-tilt head, and a three-dimensional pan-tilt head holder.

2. A fill light for photographing device, comprising:
a lighting assembly;
a supporting assembly, wherein said lighting assembly is adjustably arranged on said supporting assembly; and
a device holder that is capable of being supported by said supporting assembly, wherein said lighting assembly comprises a lighting body, a retainer and a base, wherein said lighting body is pivotally coupled to said retainer, wherein said retainer is adjustably arranged on said base, wherein said base retains and supports said retainer on said supporting assembly, wherein said retainer supports said lighting body, so as to allow said lighting body to form a fill lighting area by illumination of said lighting body, wherein when the photographing device is held by said device holder, said lighting body provides fill lighting for the photographing device;
wherein said lighting body has a circular shape, so as to provide annular illumination towards the fill lighting area;
wherein said lighting body comprises a housing, a cover and at least one lighting element provided between said housing and said cover, wherein said at least one lighting element is electrically conducted so as to be able to provide the illumination.

3. The fill light according to claim 2, wherein said lighting body further comprises a control unit which is electrically connected to said at least one lighting element, so as to control working modes of said at least one lighting element, wherein by control of said control unit, said at least one lighting element of said lighting body is capable of providing a white light mode, a yellow light mode, and a warm white mode.

4. The fill light according to claim 2, wherein said at least one lighting element of said lighting body has a light condensing mode, a parallel light mode and an astigmatic mode, wherein said at lease one lighting element is switched among said light condensing mode, said parallel light mode and said astigmatic mode, wherein in said light condensing mode, light emitted by said at least one lighting element converges toward a central axis of said lighting body; wherein in said parallel light mode, light emitted by said at least one lighting elements is parallel to the central axis of the lighting body; wherein in said astigmatic mode, light emitted by said at least one lighting element is radiated outward from said light body, so as to increase the fill lighting area formed by illumination of said lighting body.

5. The fill light according to claim 4, wherein in said light condensing mode and said astigmatism mode, an angle α between light emitted by said lighting body and the central axis of the lighting body is in a range of $0°<\alpha<10°$.

6. The fill light according to claim 1, A fill light for photographing device, comprising:
a lighting assembly;
a supporting assembly, wherein said lighting assembly is adjustably arranged on said supporting assembly; and
a device holder that is capable of being supported by said supporting assembly, wherein said lighting assembly comprises a lighting body, a retainer and a base, wherein said lighting body is pivotally coupled to said retainer, wherein said retainer is adjustably arranged on said base, wherein said base retains and supports said retainer on said supporting assembly, wherein said retainer supports said lighting body, so as to allow said lighting body to form a fill lighting area by illumination of said lighting body, wherein when the photographing device is held by said device holder, said lighting body provides fill lighting for the photographing device, wherein said retainer comprises a retaining connector and a retaining supporter, wherein said lighting body is mounted to said retaining connector of said retainer, wherein said retaining connector is pivotally connected to said retaining supporter, so as to allow pivotal movement of said retaining connector.

7. The fill light according to claim 6, wherein said retaining connector comprises a support rod and a ball body connected to said support rod, wherein said retaining supporter comprises a base body, a base seat at a bottom of said base body, and a fastening switch, wherein said base body has an accommodating cavity for receiving said ball body of said retaining connector, wherein said support rod is protruded outward from said ball body which is retained in said accommodating cavity.

8. The fill light according to claim 7, wherein said retaining supporter has a slot formed at an upper end of said base body of said retaining supporter and is communicated to said accommodating cavity.

9. The fill light according to claim 7, wherein said base comprises a connecting element and a supporting element, wherein said connecting element is pivotally connected to said supporting element, wherein said supporting element is mounted to said supporting assembly, wherein said retaining supporter of said retainer is mounted on said connecting element so as to mount and support said retainer by said connecting element.

10. The fill light according to claim 9, wherein said connecting element is able to rotate 180° with respect to said supporting element.

11. The fill light according to claim 9, wherein said connecting element is supported by said supporting element in a manner that said connecting element is able to rotate in a plane with respect to a pivot point, wherein said retaining connector is supported by said retaining supporter in a manner that said retaining connector is able to rotate in a space with respect to a fulcrum on said retaining supporter, so that illumination direction of light emitted by said lighting body is able to to be adjusted to any direction based on adjustment by said retainer and said base.

12. The fill light according to claim 11, wherein an rotating angle θ of said connecting element of said base with respect to said pivot point is in a range of $-90°≤\theta≤90°$, wherein said retaining connector is supported by said retaining supporter and a rotation angle γ of said retaining connector in the space is in a range of $-60°≤\gamma≤60°$.

13. The fill light according to claim 9, wherein said base is supported on a top of said supporting assembly, and by adjusting an angle between said connecting element and said supporting element, said lighting body is able to extend outward along an extending direction of said connecting element with a connection between said connecting element and said supporting element as a fulcrum, allowing said lighting body to be supported at one of an outer side, an upper side, and an obliquely upward side of said supporting assembly, wherein said retaining supporter of said retainer is fixed to said connecting element, and said retaining connector of said retainer pivotally and axially rotatably move at any angle within a conical space with respect to a center of the retaining supporter, so as to adjust an illumination direction and angle of said lighting body.

14. The fill light according to claim 9, wherein said connecting element comprises a locking member and a pivot member coupled to said locking member, wherein said locking member is connected to said retaining supporter of said retainer, wherein said pivot member is pivotally connected to said supporting element.

15. A fill light for photographing device, comprising:
a lighting assembly;
a supporting assembly, wherein said lighting assembly is adjustably arranged on said supporting assembly; and
a device holder that is capable of being supported by said supporting assembly, wherein said lighting assembly comprises a lighting body, a retainer and a base, wherein said lighting body is pivotally coupled to said retainer, wherein said retainer is adjustably arranged on said base, wherein said base retains and supports said retainer on said supporting assembly, wherein said retainer supports said lighting body, so as to allow said lighting body to form a fill lighting area by illumination of said lighting body, wherein when the photographing device is held by said device holder, said lighting body provides fill lighting for the photographing device,
wherein said supporting assembly comprises a telescoping rod and a stand, wherein said base of said lighting assembly is arranged on said telescoping rod of said supporting assembly, wherein said stand is provided on a bottom of said telescoping rod to support said telescoping rod;
wherein said stand, which is detachably disposed at said bottom of said telescoping rod, comprise at least three supporting legs and at least three leg braces, wherein one end of each supporting leg is slidably disposed on the telescoping rod, and one end of each leg brace is provided on said telescoping rod and is arranged below said corresponding supporting leg, the other end of each leg brace is provided on said corresponding supporting leg, and said corresponding supporting leg is supported by said leg brace in such a manner that said three supporting legs is able to be unfolded and extend outward to form a triangular support structure, wherein said supporting assembly further comprise a disengagement prevention member for retaining said at least three leg braces of said stand at said bottom of said telescoping rod;
wherein said device holder comprises a mounting member and a device clamp, wherein said mounting member is detachably mounted to said telescoping rod, wherein said device clamp is pivotably connected to said mounting member, and an shooting angle of the photographing device is adjusted by adjusting a rotation angle between said device clamp and said mounting member, wherein said device clamp comprises a fixed part and at least one movable part, wherein said at least one movable part is capable of moving telescopically with respect to said fixed part, and a holding space is formed between said fixed part and said movable part, and a space size of said holding space of said device clamp is adjusted by adjusting a position of said movable part, so as to fit with different sizes of the photographing devices.

* * * * *